(12) United States Patent
Kriech

(10) Patent No.: US 8,168,696 B2
(45) Date of Patent: May 1, 2012

(54) METHOD OF USING POROUS AGGREGATE IN ASPHALT COMPOSITIONS

(75) Inventor: Anthony J. Kriech, Indianapolis, IN (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 1017 days.

(21) Appl. No.: 12/122,979

(22) Filed: May 19, 2008

(65) Prior Publication Data

US 2008/0311292 A1 Dec. 18, 2008

Related U.S. Application Data

(60) Provisional application No. 60/938,861, filed on May 18, 2007.

(51) Int. Cl.
*C08K 9/10* (2006.01)

(52) U.S. Cl. .............................. 523/210; 524/59; 524/64

(58) Field of Classification Search .................. 523/210; 524/59, 64
See application file for complete search history.

(56) References Cited

U.S. PATENT DOCUMENTS

| 5,219,901 | A | * | 6/1993 | Burke et al. | ................... 523/205 |
| 5,762,699 | A | | 6/1998 | McGovern | |
| 5,951,199 | A | * | 9/1999 | Matsushita | ..................... 404/17 |

FOREIGN PATENT DOCUMENTS

| GB | 908492 | 10/1962 |
| GB | 2327669 | 2/1999 |

* cited by examiner

*Primary Examiner* — Edward Cain
(74) *Attorney, Agent, or Firm* — Brinks Hofer Gilson & Lione

(57) ABSTRACT

Porous aggregates are coated with latex or water-based paints so as to lower the absorbility of the aggregates. When the paint-coated aggregates are mixed with an asphalt binder to produce an asphalt composition, the paint-coated aggregates absorb less of the asphalt binder, resulting in costs savings of the asphalt binder. In addition, the paint-coated aggregates avoid problems associated with selective absorption of components of the asphalt binder.

20 Claims, No Drawings

METHOD OF USING POROUS AGGREGATE IN ASPHALT COMPOSITIONS

RELATED APPLICATION

This application is based upon U.S. Provisional Patent Application Ser. No. 60/938,861, filed May 18, 2007 to which priority is claimed under 35 U.S.C. §120.

TECHNICAL FIELD

The present invention relates to asphalt compositions that are formulated with aggregate materials. More specifically the present invention relates to a method of incorporating porous aggregate materials into asphalt compositions.

BACKGROUND ART

Asphalt compositions that are used in paving applications include an aggregate component and an asphalt binder (also referred to as "liquid asphalt"). Hot mix asphalt paving compositions are made by heating and drying aggregate and mixing the aggregate with a proportioned amount of liquid asphalt. The liquid asphalt component binds the aggregate into a paving mixture that can be laid down and compacted to form roads, streets, airport run-ways, parking lots, walkways, etc.

Aggregates used in asphalt compositions for pavement applications generally have some porosity which tends to absorb asphalt into the pore structure. The amount or extend of this absorption is becoming more important as the sources for higher quality aggregates are used up and lower quality, higher porosity, aggregates must be used in their place. In addition, geographic proximity often predicates the utilization of marginal, more absorptive aggregates, since the alternative is to transport aggregate over distances which increases the cost to asphalt manufacturers.

In asphalt technology, absorption is a very complex subject. Although some absorption may lead to improved strength in compacted mixtures due to mechanical interlocking, the portion of the asphalt which is absorbed is not available for binding the aggregate particles together in the asphalt paving mix. In addition, when porous aggregates absorb asphalt components slowly over time, undesirable voids can be produced in applications such as pavements. Furthermore, if the porous aggregate selectively absorbs components of the asphalt, the nonabsorbed asphalt may have different physical, rheological, and chemical properties than the original asphalt. In such a case, the nonabsorbed bulk asphalt (effective asphalt) may be the weak link because selective absorption may promote extraction of certain asphalt fractions such as the polar compounds, aromatics, or saturates from the maltenes, leaving the bulk phase rich in such fractions as asphaltenes. This component segregation may lead to less temperature susceptible bulk phases which may in turn be more susceptible to distresses such as, low temperature cracking, fatigue and moisture damage.

The most common method of attempting to deal with absorptive aggregates is to increase the asphalt content of the mix; this solves the problem sometimes, but not always. If the absorption is fast enough and is essentially completed during the mix design procedure, this solution is adequate. If, on the other hand, the absorption is slow, the need for additional asphalt content will not be detected in the mix design, resulting in mixes which eventually have too little asphalt, and fail. Adding extra asphalt to the slow absorbing aggregate also causes problems because the mix is over-asphalted when placed and will be tender and difficult to compact. The mix may also flush initially in the pavement.

While there are several methods that have been proposed for determining the absorption capacity of aggregates, no standard test method has been developed to evaluate, describe and specify the absorptive characteristic of an aggregate with respect to asphalt.

Nevertheless, within the asphalt industry porous aggregates have been recognized and generally identified by source or type. For example, Florida lime rock and southern Indiana lime rock are known identified sources of porous aggregates which are not generally suitable for use in asphalt compositions. In fact, in the case of Florida lime rock, rather than use this aggregate in local asphalt applications, other less porous aggregate is transported to Florida from Canada for use in asphalt applications. An example of a recognized type of porous aggregate is blast furnace slag. More generally, aggregate materials are classified as natural and artificial, with natural aggregates including those from natural sources such as gravels and natural sand, and crushed stone, and artificial aggregate including blast furnace slag, steel slag, wet-bottom boiler slag, and lightweight aggregate. There are both natural and artificial porous aggregate materials.

The present invention provides a method of incorporating porous aggregate materials into asphalt compositions in such a manner that reduces the overall amount of liquid asphalt in the resulting compositions and avoids problems associated with selective absorption.

DISCLOSURE OF THE INVENTION

According to various features, characteristics and embodiments of the present invention which will become apparent as the description thereof proceeds, the present invention provides a method of reducing the amount of asphalt binder used when producing an asphalt composition which involves:

providing a porous aggregate;

coating the porous aggregate with a latex or water-based paint to form a paint-coated aggregate;

drying the paint-coated aggregate; and mixing the paint-coated aggregate with an asphalt binder to produce an asphalt composition, wherein the paint-coated aggregate absorbs less of the asphalt binder than a similar non-paint-coated aggregate.

The present invention further provides a method of producing an asphalt composition which involves:

providing a porous aggregate having an absorbility;

coating the porous aggregate with a latex or water-based paint to lower the absorbility of the porous aggregate and provide a paint-coated aggregate;

drying the paint-coated aggregate; and mixing the paint-coated aggregate with an asphalt binder to produce an asphalt composition.

The present invention also provides an asphalt composition which comprises a paint-coated porous aggregate and an asphalt binder.

The present invention further provides pavements formed from the asphalt compositions.

BEST MODE FOR CARRYING OUT THE INVENTION

The present invention is directed to a method of incorporating porous aggregate materials into asphalt compositions in such a manner that reduces the overall amount of liquid asphalt in the resulting compositions and avoids problems associated with selective absorption. According to the present invention porous aggregates are coated with a latex or water-based paint and dried. The resulting paint-coated aggregate is then combined in an asphalt composition in a conventional manner. During the course of the present invention is was determined that by initially coating the porous aggregate with a latex or water-based paint, the resulting paint-coated aggregate absorbed up to about 55 wt. % less liquid asphalt (at 3% paint residue) as compared to uncoated porous aggregate and about 17 wt. % less liquid asphalt (at 2% paint residue) as compared to uncoated porous aggregate. Although larger percentages of paint residue could provide greater reduction of liquid asphalt, in general savings of 55 wt. % and even 15-50 wt. % would be of great benefit to the asphalt industry. The effect is a significant reduction in the amount of liquid asphalt required for a given asphalt composition together with cost savings for the reduced amount of the liquid asphalt. Moreover, because the paint coating on the surface and in the pours of the aggregate effectively seals these surfaces, the paint-coated aggregate avoids problems associated with selective absorption of components in the liquid asphalt.

During the course of the present invention it was determined that while paints other than latex or water-based can be used to coat aggregate material, the use of paints other than latex or water-based, such as oil-based paints results in problems when volatile components are released during drying of the aggregate or when the resulting coated-aggregate is heated during the preparation of an asphalt composition. Accordingly, according to the present invention latex or water-based paints are preferred.

The latex or water-based paint is coated on the aggregate material by any suitable method that coats the aggregate particles and seals the pores, such as spray mixing, batch mixing, shear mixing, etc. The aggregate material can be dried before being coated with the latex or water-based paint to remove moisture from the aggregate material. Further, once coated, the paint-coated aggregate can be dried at ambient temperature or heat-dried. The paint-coated aggregate should be dried or processed after mixing with the latex or water-based paint in a manner that prevents of minimizes the formation of lumps of clusters of the aggregate. Otherwise, any lumps of clusters of the aggregate that are formed should be broken up. When processed together as part of a hot mix asphalt process, the paint-coated aggregate can be dried as it is heated and fed into an asphalt planet/apparatus.

Reference herein to porous aggregates is meant to include aggregate materials that are know in the industry and considered to be porous, including, Florida lime rock southern Indiana lime rock, blast furnace slag and other aggregate materials that have similar porosities when tested by any standard or comparable test method.

It is to be understood that the method of the present invention is not limited to only aggregate materials that are known or recognized in the asphalt industry as being porous. However, the benefits of the present invention, such as reducing the amount of liquid asphalt required in an asphalt composition containing porous aggregate, and the avoidance of selective absorption of components of the liquid asphalt, is proportional to the porosity or absorbability of the aggregate material used. Less porous aggregate materials that are not considered or classified as porous in the asphalt industry can be used; however, the benefits of the present invention may not be fully appreciated.

In general, absorption refers to the susceptibility of an aggregate to absorb water. Percent adsorption is the ratio of water that fills pours to the oven-dry weight of the aggregate, excluding free moisture. A porous aggregate will absorb asphalt, and if not considered during design, the mixture will be dry. An aggregate with 1% or less absorption is considered good for hot mix asphalt mixtures. As an example, most South Carolina aggregates, excluding marine limestone, have absorption rates of less than 1%. Aggregate materials that have absorption rates greater than 1% and would otherwise be considered porous in the asphalt industry are particularly suitable for use in the present invention.

The porosity of an aggregate material is typically taken into consideration when determining the amount of asphalt binder required so as to compensate for absorption of binder into the aggregate. This can be accomplished by evaluating the bulk specific gravity (or bulk density) of all the pore space of an aggregate, the apparent specific gravity that does not include any of the pores that would fill with water during soaking and the effective specific gravity that excludes only those pores that would absorb binder.

Once an aggregate is determined to be porous for purposes that would normally be used to consider the necessity of increasing the amount of asphalt binder required to produce an asphalt composition including the aggregate, the porous aggregate becomes a candidate for coating with a latex or water-based paint in order to avoid or limit absorption of asphalt binder according to the present invention.

The following non-limiting examples are provided to demonstrate features and characteristics of the present invention. In the Examples and throughout, percentages are given as weight percentages unless otherwise indicated or determined from context.

EXAMPLE 1

An absorptive limestone from a southern Indiana quarry was selected for this example. All testing was conducted in accordance with The Asphalt Institute MS-2 manual on asphalt mix design methods. The 9.5 mm aggregate was coated with 2.85% (2% residual) and 4.25 (3% residual) paint by weight separately. The paint was latex house paint. Table 1 gives information on testing the aggregate for water absorption and asphalt absorption.

TABLE 1

| Test | Untreated Aggregate | 2% Residual Painted Aggregate | 3% Residual Painted Aggregate |
|---|---|---|---|
| Specific Gravity $G_{sb}$ (Bulk) | 2.451 | 2.418 | 2.399 |
| Specific Gravity $G_{sb}$ (SSD) | 2.560 | 2.508 | 2.486 |
| Specific Gravity $G_{sb}$ (Apparent) | 2.751 | 2.658 | 2.629 |
| Water Absorption % | 4.5 | 3.8 | 3.7 |
| Theoretical Specific Gravity ($G_{mm}$) | 2.445 | 2.377 | 2.392 |
| Asphalt Content % | 4.0 | 4.0 | 4.0 |
| Effective Specific Gravity ($G_{se}$) | 2.594 | 2.530 | 2.473 |
| Asphalt Absorption % | 2.3 | 1.9 | 1.3 |

Typically the asphalt absorption is 50-60% of the water absorption in aggregates due to the higher viscosity of asphalt at the hot mix temperature of 150-160° C. This is true on the untreated aggregate, but at the 3% residual paint coatings this does not follow. The test data suggests that it is possible to get water to absorb into the paint coated aggregate easier than asphalt.

The data from this example shows that painted aggregate is able to reduce asphalt absorption 17% for 2% paint residue and 56% for 3% paint residue versus the untreated aggregate.

EXAMPLE 2

In this example the asphalt absorptions of three different limestone aggregates were determined for comparison purposes. The absorption data is presented in Table 2 below. This data will be used as a guide to see how the highest absorptive aggregate can be improved to behave similarly to the lowest absorptive aggregate in Table 2. All three sources are 9.5 mm size aggregate.

TABLE 2

| Test | Indiana Limestone Source A | Indiana Limestone Source B | Indiana Limestone Source C |
|---|---|---|---|
| Specific Gravity $G_{sb}$ (Bulk) | 2.451 | 2.511 | 2.733 |
| Water Absorption, % | 4.5 | 3.4 | 2.0 |
| Asphalt Absorption, % | 2.3 | 2.0 | 1.2 |
| Asphalt Content | 4.0 | 4.0 | 4.0 |

As noted above in Example 1, by mixing 3% residual paint on Source A (from Table 1), it was possible to achieve an asphalt absorption of 1.3% which is very similar to the untreated Limestone Source C (Table 2) of 1.2%. These two aggregates should behave in a similar fashion on asphalt absorption.

EXAMPLE 3

In this example, Indiana Limestone Source A (used in Examples 1 and 2) was mixed with 3% residual paint. This painted aggregate was then used in a mix design and compared to untreated Source A and also compared to untreated Indiana Limestone Source C. The mix design was performed in accordance with The Asphalt Institute MS-2 manual using a Superpave 12.5 mm mixture. Additional asphalt was added to Source A untreated to compensate for absorption. The test data from this example is presented in Table 3 below.

TABLE 3

| Test | Source A Untreated | Source A 3% Residual Paint | Source C Untreated |
|---|---|---|---|
| 9.5 mm Aggregate | 50% | 50% | 50% |
| 4.75 mm Aggregate | 50% | 50% | 50% |
| Asphalt Content % | 6.5 | 6.0 | 6.0 |
| Air Voids | 4.1 | 4.0 | 4.0 |

During the course of this example it was found that in order to achieve the same volumetrics (air voids), an additional 0.5% asphalt content for Source A limestone untreated was required to achieve the same air voids as the Source A with 3% residual paint and Source C untreated. This additional required asphalt absorbs into the pores and has no useful purpose and only adds to the overall cost of the mixture. This example shows that the painted aggregate prevented significant absorption which was 50% of the aggregate in the mixture.

On an economic basis the paint coated aggregate saved 10 lbs. of asphalt per ton of hot mix asphalt or $2/ton of hot mix based on $400.00 ton for asphalt cement. On a typical hot mix plant producing 200,000 tons/yr, this translates to a value of $400,000.

EXAMPLE 4

In this example the laboratory trials were scaled up to field trials using a hot mix plant. Limestone from Source A was mixed through a standard pugmill with paint. Paint coated a blend of 19 mm and 9.5 mm limestone aggregate at 4.28% (3% residual paint). Two hundred tons of coated aggregate was stockpiled for two days to allow for curing. The paint coated aggregate was then passed through a standard drum mix plant. This aggregate represented 57% of the paving mixture with fine aggregate and asphalt making up the remainder. A second test was performed using untreated aggregate with the same blend and which was also passed through the hot mix plant. In the case of the untreated aggregate, the asphalt content was increased from 4.0% to 4.5% to account for absorption. The two paving materials were placed as pavement on a parking lot at the facility. Compactive efforts from rollers were the same.

Tests taken during production found that volumetric properties of both mixtures were similar with air voids of 4.05 and 4.1% for painted and untreated aggregate. This indicates that the laboratory and field results matched each other and that the paint prevented absorption into the aggregate.

EXAMPLE 5

Another widely used absorptive aggregate is blast furnace slag. This aggregate is produced in a blast furnace of a steel mill and has high frictional properties for surface mixtures on highways. The aggregate absorbs significant asphalt during and after production. These pavement materials often look dry and old after only a few years of surface. This is to a great extent caused by the absorptive nature of the slag.

In this example blast furnace slag aggregate was mixed with paint to achieve a 3% residual paint. The paint was mixed as the aggregate is dropped from the cold feed where paint is sprayed onto the falling aggregate to get uniform coating. This coated paint was then carried directly into the hot mix plant where it was dried, heated and mixed with asphalt.

The blast furnace slag represented 30% of the total mix. The asphalt absorption for this material was 2.0%. The asphalt content of the mixture was reduced 0.6% asphalt based on asphalt absorption. The untreated mixture was made at 6.6% versus 6.0% for painted aggregate mixture. 400 tons of the painted aggregate mixture was placed on a pavement, side by side with the untreated aggregate mixture. The same compactive effort was used in both mixtures. Volumetrics showed that both mixtures had similar air voids of 4.2 and 4.3%. This example shows that it is possible to reduce asphalt absorption of the blast furnace slag aggregate using paint.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and as set forth in the attached claims.

What is claimed is:

1. A method of reducing the amount of asphalt binder used when producing an asphalt composition which comprises:
   providing a porous aggregate;
   coating the porous aggregate with a paint selected from latex paint or water-based paint to form a paint-coated aggregate;
   drying the paint-coated aggregate; and
   mixing the paint-coated aggregate with an asphalt binder to produce an asphalt composition,
   wherein the paint-coated aggregate absorbs less of the asphalt binder than a similar non-paint-coated aggregate.

2. A method of reducing the amount of asphalt binder used when producing an asphalt composition according to claim 1, wherein the paint-coated aggregate absorbs up to about 55 wt. % less of the asphalt binder than the similar non-paint-coated aggregate.

3. A method of reducing the amount of asphalt binder used when producing an asphalt composition according to claim 2, wherein the paint-coated aggregate absorbs from about 15 to about 50 wt. % less of the asphalt binder than the similar non-paint-coated aggregate.

4. A method of reducing the amount of asphalt binder used when producing an asphalt composition according to claim 1, wherein the porous aggregate has an absorption rate of greater than 1%.

5. A method of reducing the amount of asphalt binder used when producing an asphalt composition according to claim 1, wherein the porous aggregate comprises a natural aggregate.

6. A method of reducing the amount of asphalt binder used when producing an asphalt composition according to claim 1, wherein the porous aggregate comprises an artificial aggregate.

7. A method of reducing the amount of asphalt binder used when producing an asphalt composition according to claim 6, wherein the porous aggregate comprises a slag aggregate.

8. A method of producing an asphalt composition which comprises:
   providing a porous aggregate having an absorbility;
   coating the porous aggregate with a paint selected from latex paint or water-based paint to lower the absorbility of the porous aggregate
   and provide a paint-coated aggregate; drying the paint-coated aggregate; and mixing the paint-coated aggregate with an asphalt binder to produce an asphalt composition.

9. A method of producing an asphalt composition according to claim 8, wherein the paint-coated aggregate absorbs up to about 55 wt. % less of the asphalt binder than the similar non-paint-coated aggregate.

10. A method of producing an asphalt composition according to claim 9, wherein the paint-coated aggregate absorbs from about 15 to about 50 wt. % less of the asphalt binder than the similar non-paint-coated aggregate.

11. A method of producing an asphalt composition according to claim 8, wherein the porous aggregate has an absorption rate of greater than 1%.

12. A method of producing an asphalt composition according to claim 8, wherein the porous aggregate comprises a natural aggregate.

13. A method of producing an asphalt composition according to claim 8, wherein the porous aggregate comprises an artificial aggregate.

14. A method of producing an asphalt composition according to claim 13, wherein the porous aggregate comprises a slag aggregate.

15. An asphalt composition which comprises a paint-coated porous aggregate and an asphalt binder.

16. An asphalt composition according to claim 15, wherein the paint-coated aggregate absorbs less of the asphalt binder than a similar non-paint-coated aggregate.

17. An asphalt composition according to claim 15, wherein the porous aggregate comprises a natural aggregate.

18. An asphalt composition according to claim 15, wherein the porous aggregate comprises an artificial aggregate.

19. An asphalt composition according to claim 15, wherein the porous aggregate comprises a slag aggregate.

20. A pavement formed from the asphalt composition of claim 15.

* * * * *